J. O. MULLER.
FASTENING DEVICE.
APPLICATION FILED JULY 15, 1919.
1,336,752.
Patented Apr. 13, 1920.
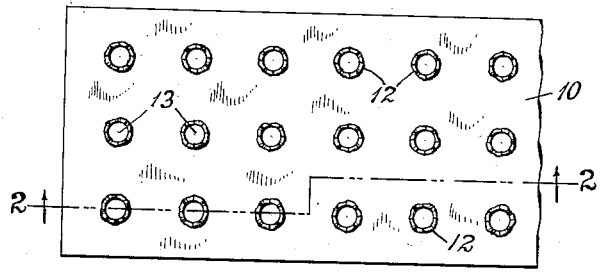
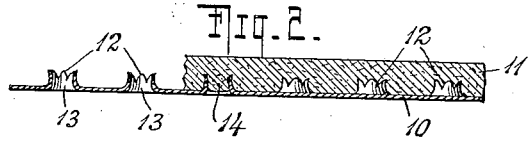
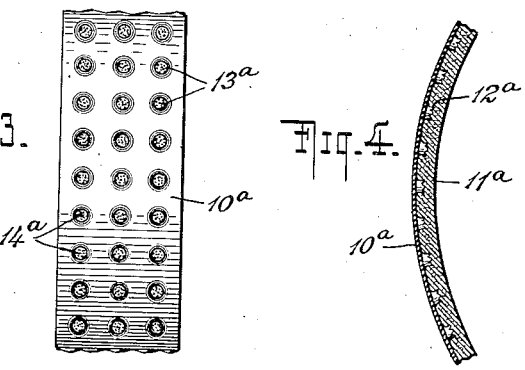
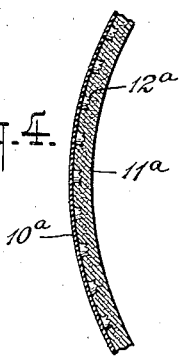
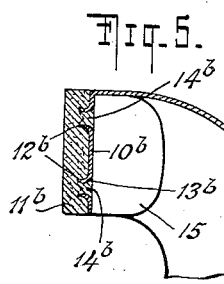
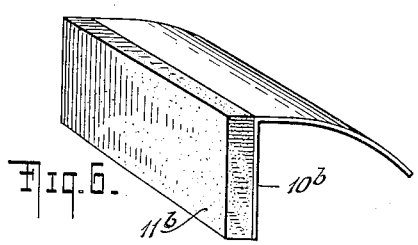
WITNESSES
INVENTOR
John O. Muller
BY
ATTORNEYS

UNITED STATES PATENT OFFICE.

JOHN O. MULLER, OF WEST HOBOKEN, NEW JERSEY.

FASTENING DEVICE.

1,336,752.  Specification of Letters Patent.  Patented Apr. 13, 1920.

Application filed July 15, 1919. Serial No. 311,014.

*To all whom it may concern:*

Be it known that I, JOHN O. MULLER, a citizen of the United States, and a resident of West Hoboken, county of Hudson, and State of New Jersey, have invented certain new and useful Improvements in Fastening Devices, of which the following is a specification.

My invention relates to fastening devices and has for its object to provide an improved fastening means whereby the elements of composite units, such as for instance brake bands and brake linings or the carrier and lining of composite liners for vise jaws are united in an efficient and novel manner. My invention will be fully described hereinafter and the features of novelty will be pointed out in the appended claims.

For the purposes of describing my invention and in order to illustrate its utility I have shown the same in the accompanying drawings as applied to a band brake and to a liner for vise jaws. In said drawings Figure 1 is a detail face view of the main carrying member provided with my improved fastening means; Fig. 2 is a sectional view thereof on the line 2—2 of Fig. 1; Figs. 3 and 4 are views showing my invention embodied in a band brake and Figs. 5 and 6 are similar views illustrating my invention embodied in a vise jaw liner.

In the drawings 10 indicates a main carrying member which is constructed of metal or other material capable of being punched out as will be hereinafter described and 11 designates a secondary member located in surface engagement with said main member 10 and constructed of a penetrable material the physical characteristics of which are such that the fastening devices whereby said two members are secured together will find a holding purchase or bite therein. The fastening devices comprise prongs 12 projecting at intervals from one surface of the main member 10 and formed by punching out the material of which said member 10 is made by means of a substantially flat punch. This produces a plurality of apertures 13 in the member 10 each of which is surrounded by irregular, ragged portions of the material which constitute the prongs 12.

The two members 10 and 11 are united by being pressed toward each other under a predetermined pressure whereby the prongs 12 are caused to penetrate into the member 11. The resistance of the latter to penetration and the physical characteristics of the material of which the member 10 is made cause the prongs 12 to clench themselves as it were in the member 10 thus increasing the holding power of said prongs and preventing unintentional separation of the members 10 and 11. At the same time the pressure exerted to press the two members 10 and 11 together causes the material of which the member 11 is constructed to be forced into the apertures 13 in the form of individual projections 14 which augment the holding forces of the prongs and still further increase the resistance against separation of said members 10 and 11. The arrangement is such that the prongs 12 do not extend through the member 11 but terminate within the same, so that the exposed, active surface of said member 11 is unbroken in continuity and is entirely free from interruption by any part of the fastening devices whereby said members are secured together.

In Figs. 3 and 4 I have shown my invention applied to a band brake, the main member, in this case, being the brake band $10^a$ of metal, while the lining $11^a$ of any customary material constitutes the secondary member. The lining $11^a$ is securely fastened to the band 10 in surface engagement therewith by the prongs $12^a$ which are punched from said band $10^a$ and by the projections $14^a$ which extend from said lining into the apertures $13^a$ of the band. The prongs $12^a$, as shown, do not penetrate to the active surface of said lining so that the braking action of the latter is fully available and capable of being utilized and at the same time the brake drum is not subjected to the injurious action of metallic fastening devices as is the case in the usual constructions in which the fastening devices are generally in the nature of rivets which extend entirely through the lining. The life of the brake lining and its efficiency as a holding medium is thus materially increased with the present invention.

In Figs. 5 and 6 I have shown my invention applied to a liner for vise jaws in which case the main member comprises a metallic carrier $10^b$ so shaped as to be capable of being fitted upon a vise jaw 15 and the secondary member comprises a lining $11^b$ of leather, fiber or other suitable material in surface engagement with a portion of said carrier 10^b and so located as to position the lining 11^b in registry with the gripping face of the jaw 15 when the liner is in operative position. Here also the lining 11^b is securely fastened to the metallic carrier 10^b by means of the prongs 12^b which are punched from the latter and by the projections 14^b which are formed upon the lining and extend into the apertures 13^b of said carrier. In this form the prongs 12^b also do not extend through the lining 11^b, the exposed, active surface of which is thus also unbroken by any part of the fastening devices whereby the gripping action of the vise might be interfered with or whereby the work being held in the vise might be injured.

The above represent but two examples of the utility of my invention, it being understood that it may be used in many additional ways as will be apparent. The invention is simple in construction and economical to produce and provides a fastening whereby two members or elements may be efficiently united in a novel and highly effective manner.

Various changes in the specific form shown and described may be made within the scope of the claims without departing from the spirit of my invention.

I claim:

1. The combination of a rigid main carrying member, a secondary member comprising a unit in surface engagement with said carrying member and devices comprising integral parts of said carrying member penetrating said secondary member without passing therethrough to secure said two members together to form a composite unit.

2. The combination of a metallic carrying member, a secondary member of penetrable material comprising a unit in surface engagement with said carrying member and a plurality of prongs comprising integral parts of said carrying member and penetrating said secondary member without passing therethrough whereby said two members are secured together to form a composite unit.

3. The combination of a metallic carrying member, a secondary member of penetrable material in surface engagement with said carrying member and a plurality of prongs punched from said carrying member and penetrating said secondary member without passing therethrough whereby said two members are secured together in the form of a composite unit, said secondary member extending into the punch apertures of said carrying member in the form of projections whereby the resistance against separation of the two members is increased.

4. The combination of a carrying member having a plurality of apertures, a secondary member in surface engagement with said carrying member and having a plurality of integral projections extending into said apertures and prongs comprising integral parts of said carrying member located about the apertures thereof and penetrating said secondary member without passing therethrough, said prongs and projections coöperating to secure said members together in the form of a composite unit.

5. The combination of a brake band, a brake lining in surface engagement therewith, and a plurality of prongs punched from said brake band and penetrating said lining without passing therethrough whereby said band and lining are secured together.

6. The combination of a brake band, a brake lining in surface engagement therewith, a plurality of prongs punched from said brake band and penetrating said lining without passing therethrough and a plurality of projections on said lining extending into the punch apertures, said prongs and projections coöperating to fasten said band and lining together.

In testimony whereof I have hereunto set my hand.

JOHN O. MULLER.